United States Patent
Sathaye et al.

(10) Patent No.: US 11,528,613 B2
(45) Date of Patent: Dec. 13, 2022

(54) SYSTEMS AND METHODS TO PROVIDE LAWFUL INTERCEPTION OF INFRASTRUCTURE STATE IN A MANNER KNOWN ONLY TO LAW ENFORCEMENT

(71) Applicant: DELL PRODUCTS L.P., Round Rock, TX (US)

(72) Inventors: Sumedh Sathaye, Austin, TX (US); Nakul Shrivastava, Pflugerville, TX (US); Satya Gopi Manapragada, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 243 days.

(21) Appl. No.: 16/920,343

(22) Filed: Jul. 2, 2020

(65) Prior Publication Data

US 2022/0007179 A1 Jan. 6, 2022

(51) Int. Cl.
*H04L 9/40* (2022.01)
*H04W 12/80* (2021.01)

(52) U.S. Cl.
CPC ............. *H04W 12/80* (2021.01); *H04L 63/20* (2013.01)

(58) Field of Classification Search
CPC ............................... H04W 12/80; H04L 63/20
USPC ......................................................... 726/20
See application file for complete search history.

(56) References Cited

U.S. PATENT DOCUMENTS

| | | | | |
|---|---|---|---|---|
| 2004/0185875 | A1* | 9/2004 | Diacakis | H04L 63/306 455/456.3 |
| 2004/0203582 | A1* | 10/2004 | Dorenbosch | H04L 63/30 455/406 |
| 2004/0255126 | A1* | 12/2004 | Reith | H04L 63/1408 713/183 |
| 2015/0189661 | A1* | 7/2015 | Lindner | H04W 52/0277 455/456.2 |
| 2016/0006713 | A1* | 1/2016 | Holtmanns | H04L 63/0428 713/168 |
| 2019/0334909 | A1* | 10/2019 | Schmitt | G06F 9/4416 |

* cited by examiner

*Primary Examiner* — Michael S McNally
(74) *Attorney, Agent, or Firm* — North Weber & Baugh LLP

(57) ABSTRACT

Described herein are systems and methods to provide lawful interception (LI) of infrastructure state in a manner known only to law enforcement. A bare-metal cloud (BMC) control module is provided to an end user to allow user configuration and management for a set of one or more physical resources that form a BMC instantiation for the end user. An LI policy and control module may be used for data traffic tracking or hardware monitoring inside the BMC instantiation upon one or more conditions are met. Upon activation, customizable hardware monitoring may be implemented unbeknownst to the end-user. Such a technique of offering customizable bare-metal level LI service unbeknownst to end-users may enable new kinds of infrastructure interception methods.

20 Claims, 6 Drawing Sheets

_600_

SYSTEMS AND METHODS TO PROVIDE LAWFUL INTERCEPTION OF INFRASTRUCTURE STATE IN A MANNER KNOWN ONLY TO LAW ENFORCEMENT

BACKGROUND

The present disclosure relates generally to interception. More particularly, the present disclosure relates to a service to intercept bare-metal infrastructure for law enforcement purposes.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Lawful interception (LI) refers to the facilities in telecommunications and telephone networks as well as in computing and storage systems that allow law enforcement agencies with court orders or other legal authorization to selectively wiretap individual subscribers. In certain situations, telecommunication, computing, or storage infrastructure owner may be required to offer LI officials access to parts or the entire infrastructure.

LI may be more effective if LI officers may examine the infrastructure in ways known only to them, at times known only to them, using parameters (e.g., names & locations) known only to them and the legal authorization, within infrastructure boundaries known only to them and authorized by legal authorization. Such an LI implementation may reduce possibilities of information filtering and/or perturbation, and therefore increase LI effectiveness and/or accuracy. Unfortunately, such an LI implementation is challenging, if not impossible, for execution because a bare-metal infrastructure may not be managed in an as-a-service manner. Furthermore, LI officers may have limited or no ability to create, upload, and/or execute their own methods of interception unbeknownst to the infrastructure operator or owner.

Accordingly, it is highly desirable to find new, more effective ways to provide LI of infrastructure state.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
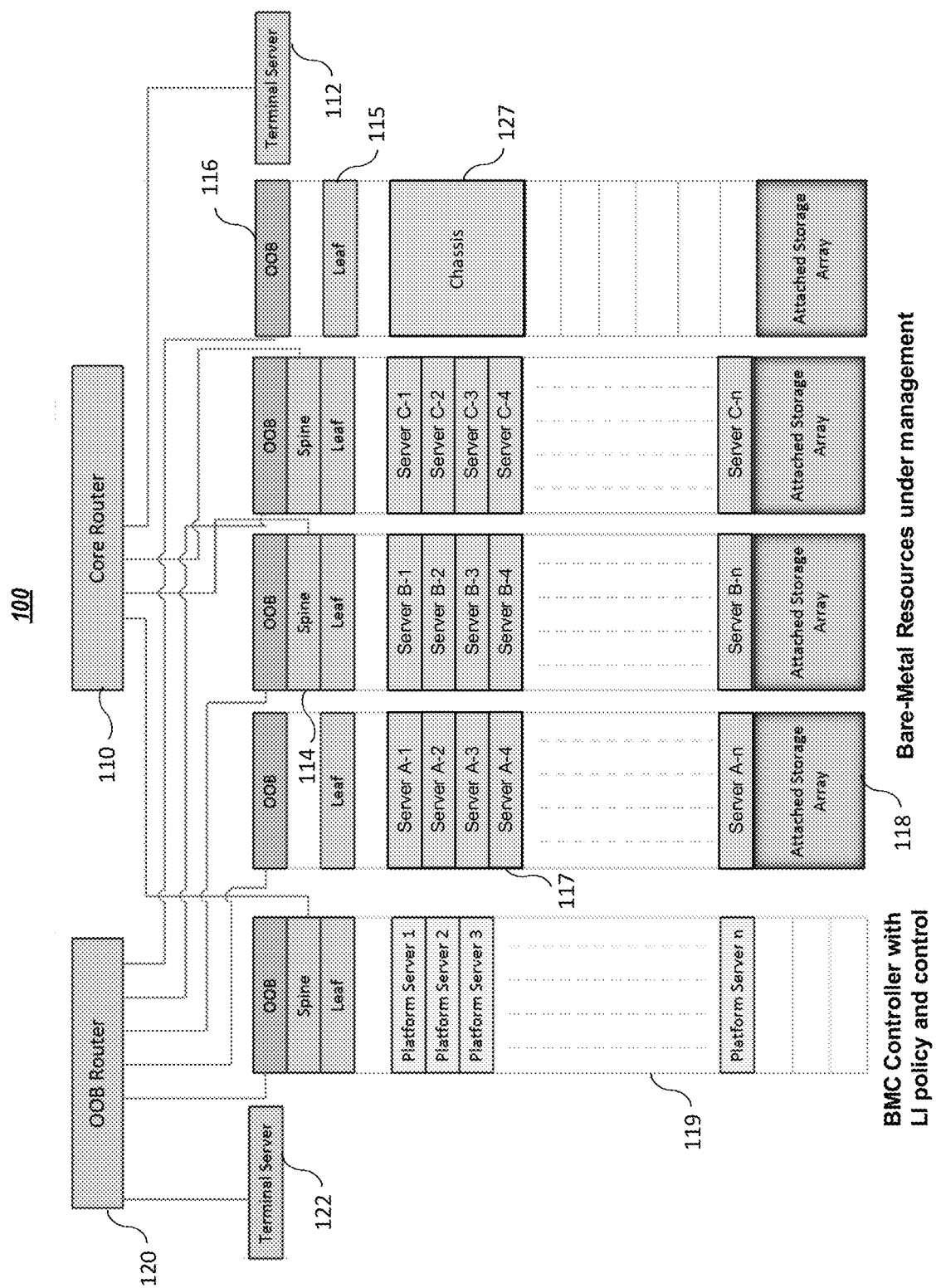
FIG. 1 ("FIG. 1") depicts bare-metal cloud (BMC) architecture, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, overlay network connections, and wireless connections. It shall also be noted that any communication, such as a signal, response, reply, acknowledgement, message, query, etc., may comprise one or more exchanges of information.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of lawful interception, aspects of the present disclosure are not so limited. Accordingly, the aspects of the present disclosure may be applied or adapted for use in other contexts.

A. Embodiments of Bare-Metal Cloud Architecture

FIG. 1 depicts high-level bare-metal cloud (BMC) architecture, according to embodiments of the present disclosure. The BMC may be offered as cloud resources with properties of cloud, e.g., the ability of a user to consume resources by spending operational expenses (OpEx) rather than capital expenditure (CapEx), dynamic scaling, or cost optimization etc. In one or more embodiments, components in the BMC architecture may be assigned to an end-user exclusively such that the components are not shared with any other end-users.

In one or more embodiments, the BMC architecture may be owned by an infrastructure provider, e.g., DELL Technologies, a telecommunications company, a service provider company etc., and offered to an end-user for cloud service. In one or more embodiments, the architecture may comprise one or more Bare-Metal resources under management of a BMC controller with LI policy and control. The one or more Bare-Metal resources may comprise a core router 110, an out-of-band (OOB) router 120, a plurality of servers 117, a plurality of spine switches 114, a plurality of leaf switches 115, a plurality of OOB switches, and a plurality of storages 118. The core router 110 is a router operating in the internet backbone of the BMC architecture to support multiple interfaces coupling to plurality of spine switches. The OOB router 120 couples to the plurality of OOB switches for a separate and dedicated OOB network via the plurality of OOB switches. In one or more embodiments, the BMC architecture is a network fabric, wherein the plurality of spine switches are responsible for interconnecting all leaf switches and each leaf switch connects to every spine switch in the fabric. In one or more embodiments, one or more servers may be mounted together in a chassis 127, e.g. a MX 7000 modular chassis, for better integration and performance. In one or more embodiments, the plurality of OOB switches switch may be used for OOB management, e.g., determining a status of a network component independent of the status of the network component in the in-band network through the core router.

In one or more embodiments, the architecture may further comprise a first terminal server 112 coupled to the core router and a second terminal server 122 coupled to the OOB router 120.

In one or more embodiments, the BMC architecture may comprise a BMC controller 119 for the end-user to control and manage resources within the architecture. The BMC controller 119 may comprise a spine switch, one or more leaf switches, one or more servers, and one or more storages. In one or more embodiments, the BMC controller 119 may further comprise one or more OOB switches coupled to the OOB router to allow OOB management.

In one or more embodiments, the end-user may configure, via the BMC controller 119, a network setting and policy, e.g., fabric path, for the BMC architecture according to the end-user's preference. Such a BMC control feature gives the end-user enhanced capacity for implementing personalized networking control and management, which would be unavailable for virtual machine (VM) cloud service. In one or more embodiments, the end-user may implement Redundant Array of Independent/Inexpensive Disks (RAID) configuration, network interface controller (NIC) configuration, BIOS settings, virtual local area network (VLAN) configuration, Jumbo frames configuration, and/or logical unit number (LUN) configuration etc. Accordingly, the end-user may enable and exercise fine-grain control over one or more aspects of bare-metal components.

In one or more embodiments, the BMC controller 119 may further comprise a policy and control module (e.g., the LI policy and control module 216 shown in FIG. 2), which may be used for data traffic tracking or hardware monitoring inside the BMC architecture upon one or more conditions are met. In one or more embodiments, upon activation, the data traffic tracking or hardware monitoring may be implemented unbeknownst to the end-user.

Although the BMC controller embodiment shown in FIG. 1 is inside the spine-leaf network architecture, one skilled in the art shall understand that the BMC controller may also be designated in other types of network architecture. Those variations shall also be within the scope of the present disclosure.

B. Embodiments of Bare-Metal Cloud Controller

Figure 2:
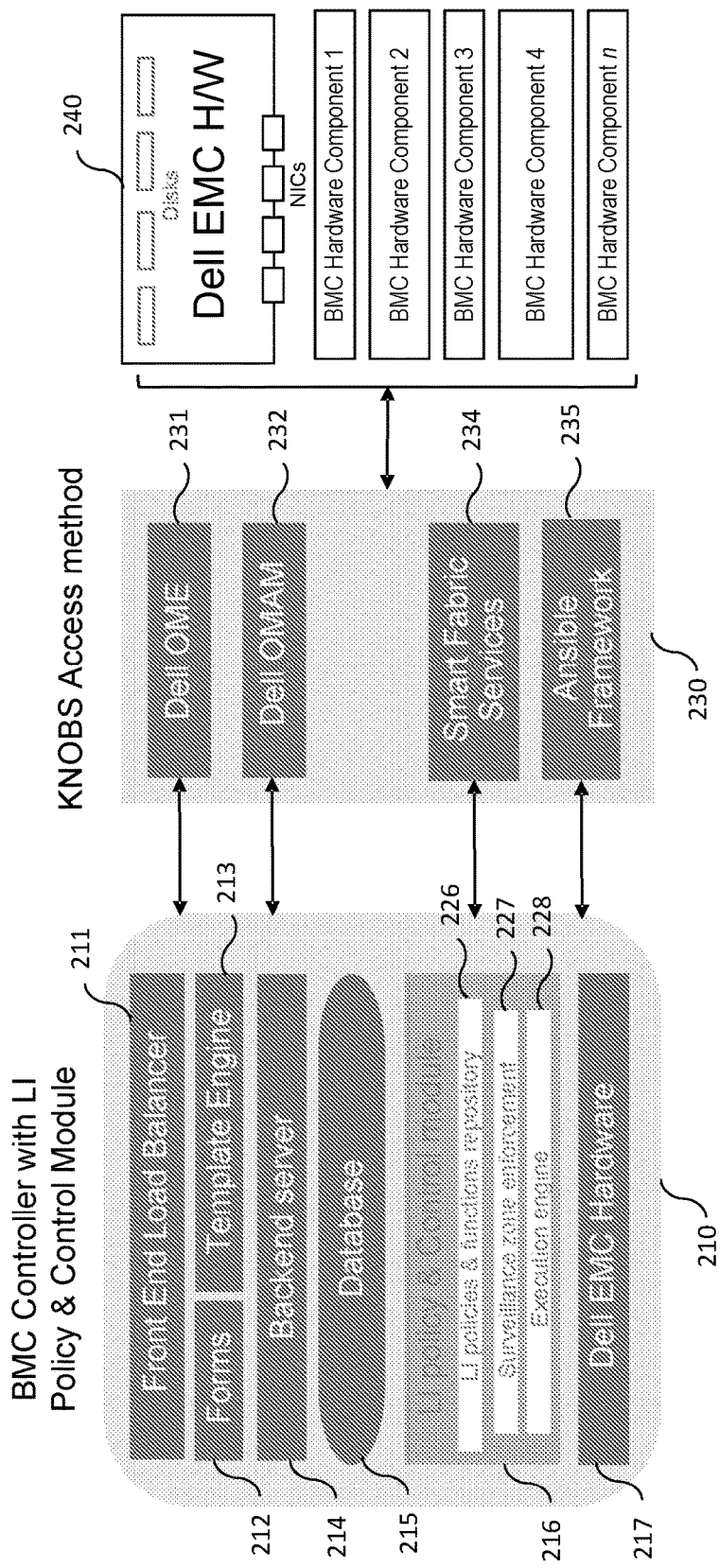
FIG. 2 depicts a block diagram for a BMC system, according to embodiments of the present disclosure.

FIG. 2 depicts a block diagram for a BMC system comprising a BMC controller module 210 and a policy and control module 216, according to embodiments of the present disclosure. The BMC controller module may manage BMC hardware 240 via one or more access methods 230. In one or more embodiments, the access methods may comprise a web-based management application, e.g., DELL OpenManage Enterprise (OME) 231, DELL OpenManage Ansible Modules (OMAM) 232, a Dell Smart Fabric Services (SFS) platform 234, and/or a ubiquitous Ansible framework 235.

In one or more embodiments, the BMC controller module 210 comprises a front-end load balancer 211, one or more web forms 212, a template engine 213, a backend server 214, and a database 215. In one or more embodiments, the front-end load balancer is a server to accept a user request and identify, based on one or more algorithms, an available backend server 214 to process the request. The backend server is the actual computer which runs an app to respond to the user request, e.g., responding based on a pair of Hypertext Transfer Protocol (HTTP) verb and Uniform Resource Identifier (URI) called route. The HTTP verb may also be called "request method" to determine how a server should respond to a particular request. In one or more embodiments, a web form 212 may be an interface, e.g., an HTML web page, which allows the user to enter the data that is sent to the backend server for processing. In one or more embodiments, the template engine 213 may be configured to replace the variables with actual values in static template files and transform the template files to a desired file format, e.g., an HTML file, which is sent to the client. In one or more embodiments, template files may be used to generate responses. Template files may contain fields and simple logic to generate HTML, JavaScript Object Notation (JSON), or similar output in response to an incoming request. The database 215 may provide an interface to save data in a persistent way to a memory. The backend server code may rely on the database for information storage and retrieval. In one or more embodiments, the BMC controller module 210 may further comprise other hardware 217 for implementing various other functions. In one or more embodiments, the hardware 217 may be a structure where the BMC controller runs. It may comprise one or more servers, multiple network ports on each server, and dedicated storage to fulfill the needs of BMC controller software.

In one or more embodiments, the BMC controller module 210 incorporates a policy and control module 216, which may be used for data traffic tracking and/or hardware monitoring inside the BMC architecture upon one or more conditions are met. In one or more embodiments, the policy and control module 216 may be accessible by a third-party, such as LI authority when one or more conditions, e.g., legal documents or warrants, are met.

In one or more embodiments, the policy and control module 216 comprises a policy and functions repository 226, surveillance zone enforcement 227, and an execution engine 228. The policy and functions repository 226 may be customizable, by a third-party such as LI authority according to legal authorization or warrant from a court, to store one or more policies, in which each policy comprise one or more configuration specifications that define behavior of the policy and control module 216. In one or more embodiments, these custom policies may be fully edited by a third-party, e.g., an auditor, or another authority with oversight powers over the LI authority, based on one or more factors. For each customized policy, a control function and along with its parameters may be generated and stored in this repository.

In one or more embodiments, the surveillance zone enforcement 227 is an enforcement submodule within the policy and control module to set up or enforce one or more boundaries, e.g., surveillance zone, for each control function, such that all LI activities are conducted within the one or more boundaries in a provable manner. In one or more embodiments, the one or more boundaries may be a hardware boundary to limit surveillance to one or more hardware, e.g., servers, for the BMC service provided to the end-user. In one or more embodiments, the one or more boundaries may comprise a specified LI time span for each of the one or more hardware.

In one or more embodiments, the execution engine 228 takes the one or more policies and associated control functions along with their parameters, and executes desired operation, e.g., surveillance, within the one or more boundaries for each policy against associated hardware.

In one or more embodiments, the customization of policy and control functions, boundary enforcement, and execution may be offered as-a-service, e.g., a lawful interception service, to a third-party. Such a lawful interception service may be implemented at infrastructure level and unbeknownst to the infrastructure operator or the end-user of BMC service. Such a feature would be highly valuable especially during a lawful investigation where it is desirable to prevent any possibility of information filtering and/or perturbation.

Figure 3:
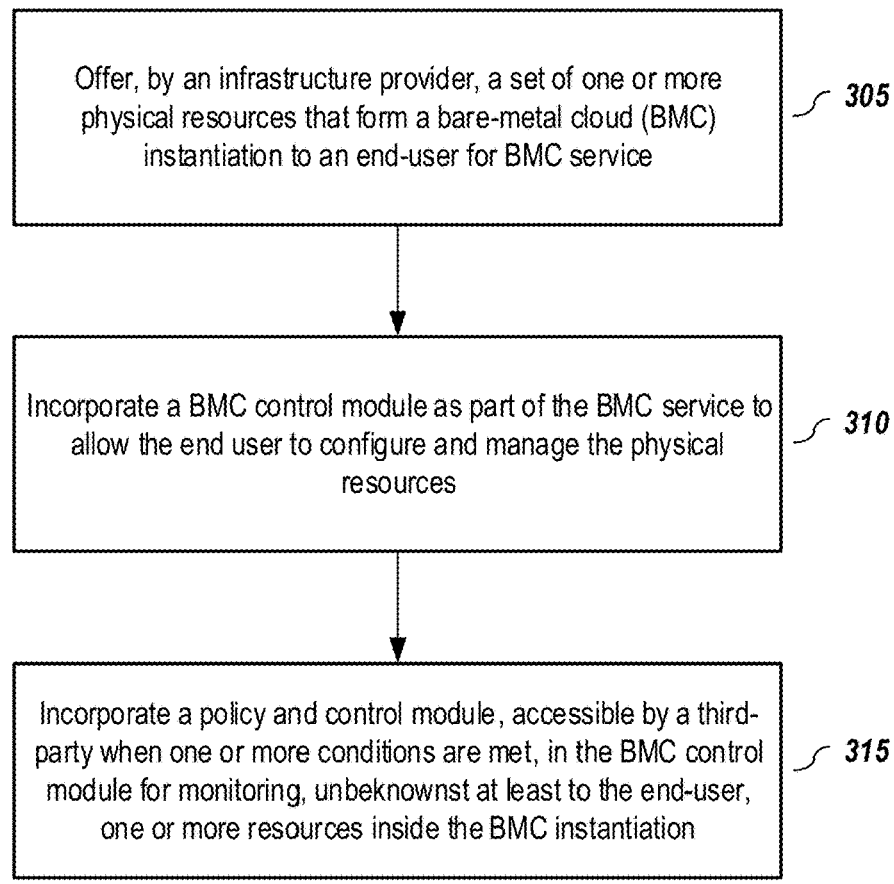
FIG. 3 depicts a process for BMC service, according to embodiments of the present disclosure.

FIG. 3 depicts a process for BMC service, according to embodiments of the present disclosure. An infrastructure provider offers (305) a set of one or more physical resources that form a bare-metal cloud (BMC) instantiation to an end-user for BMC service. In one or more embodiments, the physical resources may comprise one or more network switches to form a network fabric, one or more servers, and one or more storages. In one or more embodiments, the physical resources may further comprise one or more OOB switches coupled to an OOB router for OOB management. A BMC control module is incorporated (310) as part of the BMC service to allow the end user to configure and manage the physical resources. In one or more embodiments, the BMC control module may access the physical resources via one or more knobs, e.g., OME, OMAM, etc. A policy and control module, accessible by a third-party when one or more conditions are met, is incorporated (315) in the BMC control module for monitoring, unbeknownst at least to the end-user, one or more resources inside the BMC instantiation.

Figure 4:
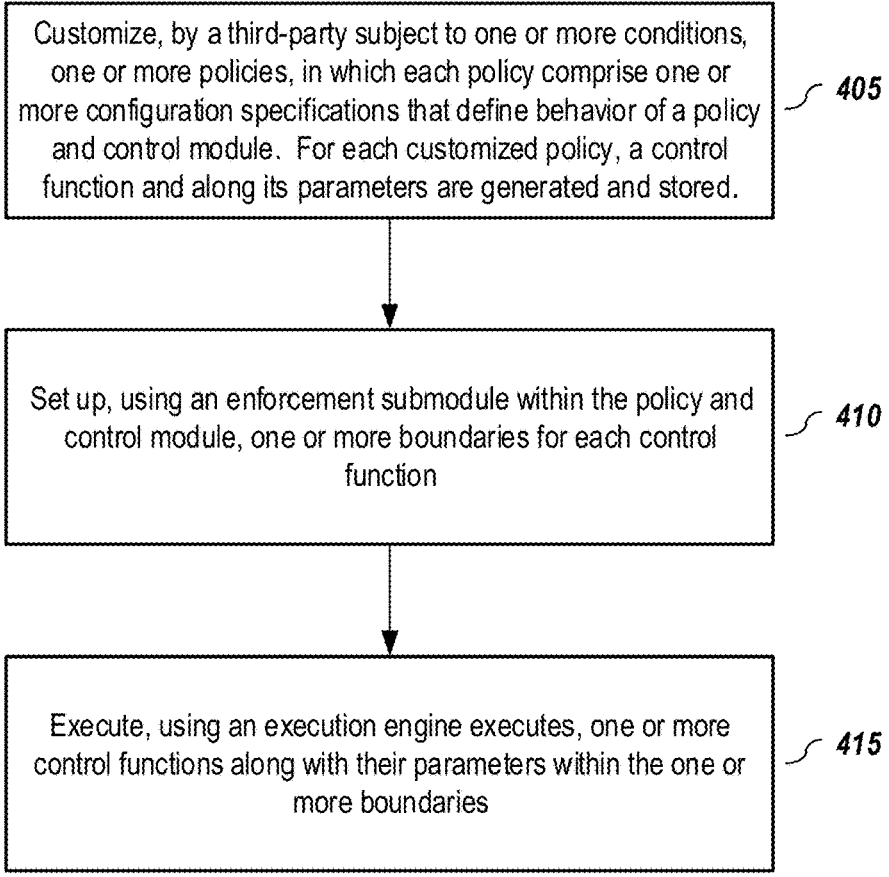
FIG. 4 depicts a process for policy and control implementation regarding a BMC service, according to embodiments of the present disclosure.

FIG. 4 depicts a process for policy and control implementation regarding a BMC service, according to embodiments of the present disclosure. A third-party customizes (405), subject to one or more conditions, one or more policies, in which each policy comprises one or more configuration specifications that define behavior of a policy and control module. For each customized policy, a control function and along with its parameters are generated and stored in a policy and functions repository within the policy and control module. In one or more embodiments, the one or conditions may be specified by or according to a legal authorization or a court warrant. In one or more embodiments, an LI authority, upon grant of rights to conduct surveillance, is given an identity within the BMC software. The identity may comprise at least a username and a password or similar authentication method. Upon identity verification, the LI authority may log in to define and add desired control function and parameters for surveillance per the grant of legal authorization, e.g., a court. In one or more embodiments, these LI actions may be carried over the OOB network that allows designated users, including LI users, to connect to and operate the BMC controller LI module and read results from the surveillance.

In one or more embodiments, the surveillance zone enforcement, an enforcement submodule within the policy and control module, sets (410) up or enforce one or more boundaries for each control function, within which any LI activities are conducted in a provable manner. In one or more embodiments, the execution engine executes (415) one or more control functions along with their parameters within one or more boundaries. In one or more embodiments, results from the execution of the one or more control function may be presented to the third-party, e.g., LI officers, for review and/or as a proof for further legal actions over the OOB networks upon identity verification of the third party.

Described in this paragraph is an application example of the present disclosure. An LI officer may need a periodic or event-based sampling of the state of a money-laundering operation, running on a Bitcoin miner pool operation under control of a BMC controller as a service. Using embodiments of the BMC system incorporated with an LI policy and control module, an LI officer may consume the interception capability as-a-service. Instead of predefined policies & controls, the BMC system may store and execute LI office and court-approved defined policies and control actions on a case-by-case basis. The LI policy and control module may segregate a "zone" of the BMC infrastructure for surveillance, and hand over interception control to an appointed official who will decide the exact interception steps, methods, and/or algorithms. This allows auditors to intercept low-level system, network, and storage components so they are capable of taking interception action known only to the authorities. All parts of the BMC infrastructure hardware under management may be "marked" and read/written/sampled by the LI officers, in an authorized manner, e.g., approved by a judge, using program logic of their collective choice. The LI process may be used to prove more than just a point-in-time state. For example, it may prove operational ability as well—of the criminal elements under surveillance. Furthermore, the LI process may be offered, unbeknownst to the end-user, even when a workload under the BMC service for the end-user is operating and a crime is potentially being committed. Such a technique of offering bare-metal level LI as a service unbeknownst to end-users may enable new kinds of infrastructure interception methods and may be valuable for various legal investigations.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
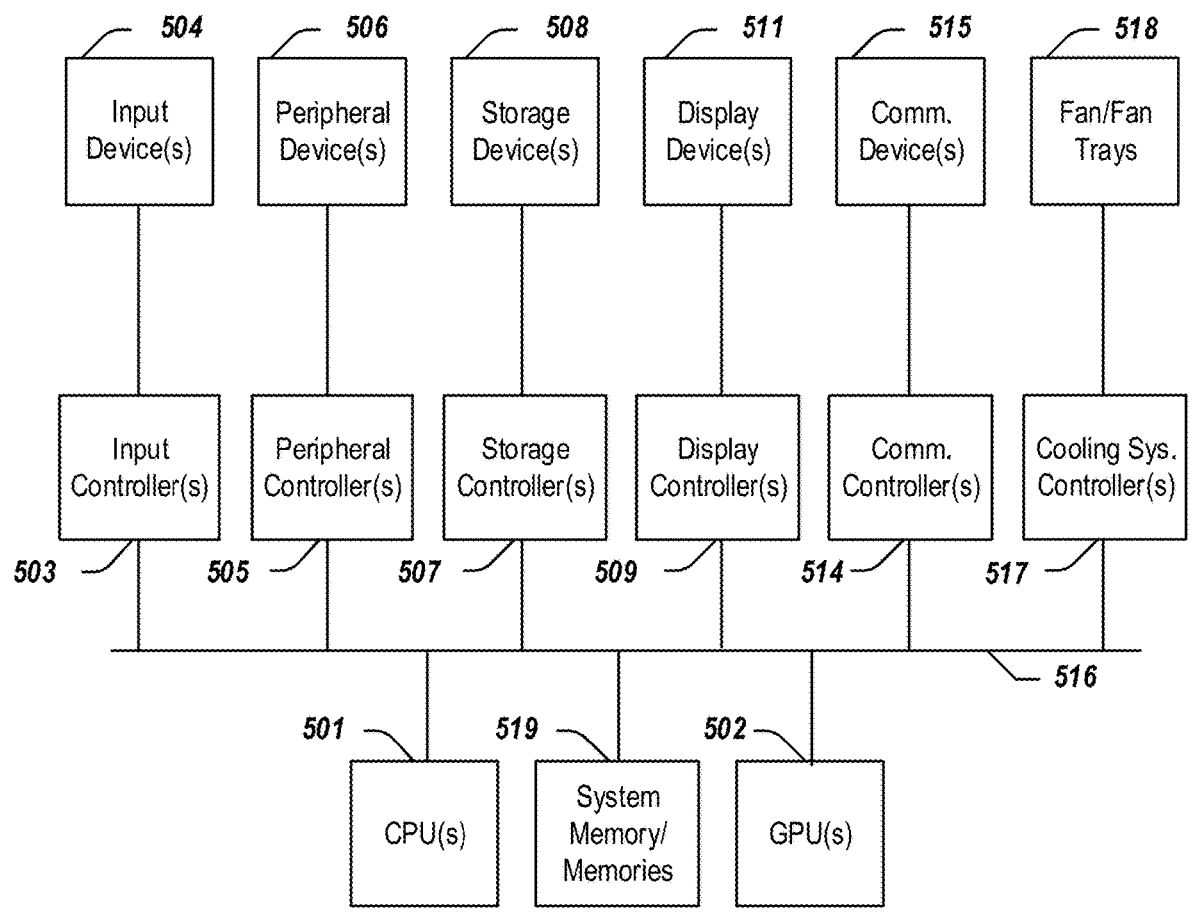
FIG. 5 depicts a simplified block diagram of an information handling system according to embodiments of the present invention.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
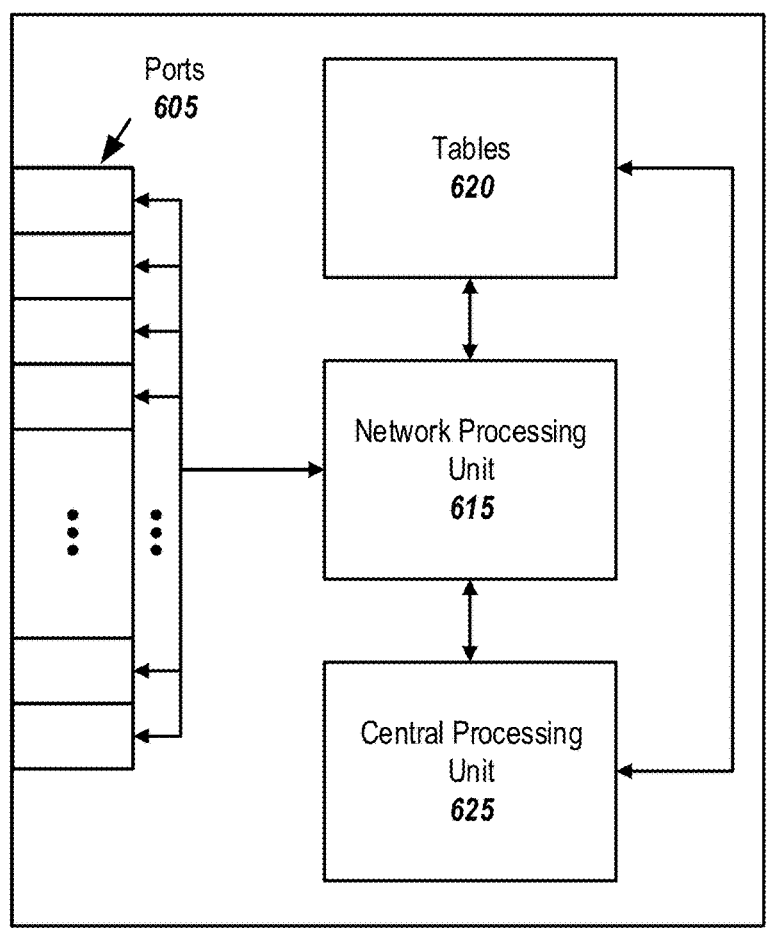
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A system for cloud service comprising:
    a bare-metal cloud (BMC) controller that allows an end user to configure and manage a set of one or more hardware resources from a plurality of hardware resources provided by an infrastructure provider, in which the set of one or more hardware resources form a BMC instantiation for the end user; and
    a policy and control module that is accessible by a third-party entity but not accessible by the end user, for granting access, upon one or more conditions being met, to at least part of the set of one or more hardware resources of the BMC instantiation of the end user, the policy and control module comprising:
    a policy and functions repository that stores:
        one or more policies for a surveillance activity to be orchestrated by the policy and control module; and
        for each policy from a set of one or more policies, a control function and parameters, if any, of the control function that sets bounds for the surveillance activity;
    an enforcement submodule that sets up or enforces one or more boundaries for the surveillance activity according to one or more control functions of the surveillance activity; and
    an execution engine that executes the surveillance activity according to the one or more policies and the one or more control functions.

2. The system of claim 1 wherein the policy and control module is offered as-a-service to the third-party entity.

3. The system of claim 2 wherein the third-party entity is a lawful interception (LI) entity and the one or more conditions comprise conditions designated by a legal authority.

4. The system of claim 3 wherein the surveillance activity of at least part of the set of one or more hardware resources of the BMC instantiation is unbeknownst to at least the end user.

5. The system of claim 1 wherein the BMC instantiation is enabled, at least in part, by one or more out-of-band (OOB) information handling systems that form an OOB network for OOB management of the BMC instantiation, the OOB network enabling the third-party entity to access the policy and control module to configure the surveillance activity by setting one or more policies, one or more control functions, or both for the surveillance activity and to obtain results related to execution of the surveillance activity.

6. The system of claim 1 wherein the BMC controller further comprises:
 a front-end load balancing component that accepts a user request from a user and identifies an available backend server to processes the user request;
 an interface that allows the user to enter data;
 a back-end server that runs an application to respond the user request;
 a template engine that transforms responding results into a desired file back to the user; and
 a database that stores previous state and changed state information of the BMC instantiation.

7. The system of claim 1 wherein the one or more control functions of the surveillance activity enforce the bounds within which the surveillance activity is conducted in a provable manner to provide a record of compliance that the surveillance activity was conducted within the bounds.

8. The system for claim 1 wherein the one or more policies are customizable by the third-party entity.

9. A computer-implemented method comprising:
 offering, by an infrastructure provider, a set of one or more hardware resources that form a bare-metal cloud (BMC) instantiation for an end user;
 offering a BMC controller to allow the end user to configure and manage the one or more hardware resources; and
 offering a policy and control module, which is accessible by a third-party entity when one or more conditions are met but not accessible by the end user, for granting access to at least part of the set of one or more hardware resources of the BMC instantiation as part of a surveillance activity, the granting access to at least part of the set of one or more hardware resources comprising steps of:
  storing, using a policy and functions repository:
   one or more policies for the surveillance activity to be orchestrated by the policy and control module; and
   for each policy from a set of one or more policies, a control function and parameters, if any, of the control function that sets bounds for the surveillance activity;
  setting up or enforcing, using an enforcement submodule, one or more boundaries for the surveillance activity according to one or more control functions of the surveillance activity; and
  executing, using an execution engine, the surveillance activity according to the one or more policies and the one or more control functions.

10. The computer-implemented method of claim 9 wherein the policy and control module is offered as-a-service to the third-party entity.

11. The computer-implemented method of claim 10 wherein the third-party entity is a lawful interception (LI) entity and the one or more conditions comprise conditions designated by a legal authority.

12. The computer-implemented method of claim 10 wherein the surveillance activity of at least part of the set of one or more hardware resources of the BMC instantiation is unbeknownst to at least the end user.

13. The computer-implemented method for claim 9 wherein the BMC instantiation is enabled, at least in part, by one or more out-of-band (OOB) information handling systems that form an OOB network for OOB management of the BMC instantiation, the OOB network enabling the third-party entity to access the policy and control module to configure the surveillance activity by setting one or more policies, one or more control functions, or both for the surveillance activity and to obtain results related to execution of the surveillance activity.

14. The computer-implemented method for claim 9 wherein the one or more control functions of the surveillance activity enforce the bounds within which the surveillance activity is conducted in a provable manner to provide a record of compliance that the surveillance activity was conducted within the bounds.

15. A non-transitory computer-readable medium or media comprising one or more sequences of instructions which, when executed by at least one processor, causes steps to be performed comprising:
 offering, by an infrastructure provider, a set of one or more hardware resources that form a bare-metal cloud (BMC) instantiation for an end user;
 offering a BMC controller to allow the end user to configure and manage the one or more physical hardware resources; and
 offering a policy and control module, which is accessible by a third-party entity when one or more conditions are met but not accessible by the end user, for granting access to at least part of the set of one or more hardware resources of the BMC instantiation as part of a surveillance activity, the granting access to at least part of the set of one or more hardware resources comprising steps of:
  storing, using a policy and functions repository:
   one or more policies for the surveillance activity to be orchestrated by the policy and control module; and
   for each policy from a set of one or more policies, a control function and parameters, if any, of the control function that sets bounds for the surveillance activity;
  setting up or enforcing, using an enforcement submodule, one or more boundaries for the surveillance activity according to one or more control functions of the surveillance activity; and
  executing, using an execution engine, the surveillance activity according to the one or more policies and the one or more control functions.

16. The non-transitory computer-readable medium or media of claim 15 wherein the policy and control module is offered as-a-service to the third-party entity.

17. The non-transitory computer-readable medium or media of claim 16 wherein the third-party entity is a lawful interception (LI) entity and the one or more conditions comprise conditions designated by a legal authority.

18. The non-transitory computer-readable medium or media of claim 16 wherein the surveillance activity of at least part of the set of one or more hardware resources of the BMC instantiation is unbeknownst to at least the end user.

19. The non-transitory computer-readable medium or media for claim 15 wherein the BMC instantiation is enabled, at least in part, by one or more out-of-band (OOB) information handling systems that form an OOB network for OOB management of the BMC instantiation, the OOB network enabling the third-party entity to access the policy and control module to configure the surveillance activity by setting one or more policies, one or more control functions, or both for the surveillance activity and to obtain results related to execution of the surveillance activity.

20. The non-transitory computer-readable medium or media for claim 15 wherein the one or more control functions of the surveillance activity enforce the bounds within which the surveillance activity is conducted in a provable manner to provide a record of compliance that the surveillance activity was conducted properly.

* * * * *